US010668656B2

(12) United States Patent
Kawamura et al.

(10) Patent No.: US 10,668,656 B2
(45) Date of Patent: Jun. 2, 2020

(54) MOLDING DIE, MOLDING DIE SYSTEM, AND COMPRESSION MOLDING METHOD

(71) Applicant: DENSO CORPORATION, Kariya, Aichi-pref. (JP)

(72) Inventors: Atsushi Kawamura, Kariya (JP); Youhei Yoshimura, Kariya (JP); Tsuyoshi Arai, Kariya (JP); Yuka Hori, Kariya (JP); Mitsuhiro Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 327 days.

(21) Appl. No.: 15/543,590

(22) PCT Filed: Jan. 19, 2016

(86) PCT No.: PCT/JP2016/000249
§ 371 (c)(1),
(2) Date: Jul. 14, 2017

(87) PCT Pub. No.: WO2016/121335
PCT Pub. Date: Aug. 4, 2016

(65) Prior Publication Data
US 2018/0001528 A1    Jan. 4, 2018

(30) Foreign Application Priority Data
Jan. 27, 2015    (JP) .................................. 2015-013374

(51) Int. Cl.
*B29C 45/40*    (2006.01)
*B29C 45/26*    (2006.01)
(Continued)

(52) U.S. Cl.
CPC ........ *B29C 45/2614* (2013.01); *B29C 44/585* (2013.01); *B29C 45/561* (2013.01);
(Continued)

(58) Field of Classification Search
CPC .... B29C 2043/3623; B29C 2043/3621; B29C 43/361; B29C 45/2614; B29C 45/80; B29C 45/77; B29C 45/561; B29C 45/28
See application file for complete search history.

(56) References Cited

U.S. PATENT DOCUMENTS 4,781,561 A * 11/1988 Casa ....................... B29C 35/02
264/40.1
5,340,528 A * 8/1994 Machida ................. B29C 45/40
264/328.7
(Continued)

FOREIGN PATENT DOCUMENTS

CN    101524885 A    9/2009
DE    19745909 A1    4/1999
(Continued)

*Primary Examiner* — Galen H Hauth
(74) *Attorney, Agent, or Firm* — Harness, Dickey & Pierce, P.L.C.

(57) ABSTRACT

In a molding die, movable die elements are respectively received in die element receiving holes formed in a frame plate. An end surface of the frame plate, which faces a cavity at a location that is other than locations of the die element receiving holes, forms a frame portion compression surface. An end surface of each movable die element, which faces the cavity, forms a split compression surface. Die element drive devices respectively drive the split compression surfaces of the movable die elements. A whole compression plate commonly supports an opposite end part of the frame plate and opposite end parts of the movable die elements, which are opposite from the cavity. When the whole compression plate is moved forward, the whole compression plate integrally drives the frame plate and the movable die elements forward. A whole drive device drives the whole compression plate.

9 Claims, 11 Drawing Sheets

(51) Int. Cl.
    *B29C 45/56*         (2006.01)
    *B29C 45/77*         (2006.01)
    *B29C 44/58*         (2006.01)
    *B29C 45/80*         (2006.01)
    B29C 45/28         (2006.01)
    B29C 33/20         (2006.01)

(52) U.S. Cl.
    CPC .............. *B29C 45/77* (2013.01); *B29C 45/80* (2013.01); *B29C 33/20* (2013.01); *B29C 45/28* (2013.01); *B29C 2045/563* (2013.01); *B29C 2045/564* (2013.01); *B29C 2045/569* (2013.01); *B29C 2945/76006* (2013.01); *B29C 2945/76257* (2013.01); *B29C 2945/76391* (2013.01); *B29C 2945/76595* (2013.01); *B29C 2945/76709* (2013.01)

(56) References Cited

U.S. PATENT DOCUMENTS

| | | | |
|---|---|---|---|
| 6,183,235 B1 * | 2/2001 | Taniguchi | B29C 45/38 425/139 |
| 7,008,575 B2 * | 3/2006 | Ogata | B29C 45/14065 264/40.5 |
| 2002/0036360 A1 | 3/2002 | Nishimoto | |

FOREIGN PATENT DOCUMENTS

| | | | |
|---|---|---|---|
| JP | 2537231 | B2 | 9/1996 |
| JP | 2799239 | B2 | 9/1998 |
| JP | 3767465 | B2 | 4/2006 |
| JP | 2006142521 | A | 6/2006 |
| JP | 3872921 | B2 | 1/2007 |

* cited by examiner (a)

(b)

(c)

MOLDING DIE, MOLDING DIE SYSTEM, AND COMPRESSION MOLDING METHOD

CROSS REFERENCE TO RELATED APPLICATIONS

This application is a U.S. National Phase Application under 35 U.S.C. 371 of International Application No. PCT/JP2016/000249 filed on Jan. 19, 2016 and published in Japanese as WO 2016/121335 A1 on Aug. 4, 2016. This application is based on and claims the benefit of priority from Japanese Patent Application No. 2015-013374 filed on Jan. 27, 2015. The entire disclosures of all of the above applications are incorporated herein by reference.

TECHNICAL FIELD

The present disclosure relates to a molding die for compression molding, a molding die system, which includes the molding die and a controller, and a compression molding method, which uses the molding die.

BACKGROUND ART

Previously, a compression molding method, which pressurizes and compresses molten resin filled in a die cavity, and a molding die, which is used in the compression molding method, are known. For example, a molding die, which is disclosed in the patent literature 1, includes a plurality of separately drivable dies. The separately drivable dies form portions of the molding die that correspond to one of two cavities of the molding die, and the separately drivable dies are arranged one after another from a gate side to a counter-gate side. After injection of molten resin into the cavity, the separately drivable dies are sequentially driven from the counter-gate side toward the gate side to compress the molten resin before solidification of the molten resin.

CITATION LIST

Patent Literature

PATENT LITERATURE 1: JP3767465B2

The technique of the patent literature 1 may be effective for a molded article where a pressure distribution in the cavity is changed in one dimension from the gate side toward the counter-gate side, like a planar plate molded article, which is shaped into a rectangular form. However, there may be a case where a molded article, which satisfies a required quality, cannot be obtained in a case of molding of a molded article, which has a complicated shape, or a molded article, at which a required surface accuracy varies depending on portions of the molded article.

SUMMARY OF INVENTION

The present disclosure is made in view of the above disadvantage, and it is an objective of the present disclosure to provide a molding die, which achieves various types of precise compression molding, and a compression molding method, which uses the molding die.

In order to achieve the above objective, a molding die according to a first aspect of the present disclosure includes a cavity, a gate seal device, a frame plate, a plurality of movable die elements, a plurality of die element drive devices, a whole compression plate and a whole drive device. A cavity is formed over a die parting surface and is to be filled with molten resin. The gate seal device is operable to close a gate, through which the molten resin flows into the cavity. The frame plate has a plurality of die element receiving holes, which open to the cavity. An end surface of the frame plate, which faces the cavity at a location that is other than locations of the plurality of die element receiving holes, forms a frame portion compression surface.

The plurality of movable die elements is respectively received in the plurality of die element receiving holes. An end surface of each of the plurality of movable die elements, which faces the cavity, forms a split compression surface. The split compression surface is displaceable in a forward direction, which is a direction toward the cavity, and a backward direction, which is a direction away from the cavity. The plurality of die element drive devices respectively drives the split compression surfaces of the plurality of movable die elements. Here, each of the plurality of movable die elements may drive the split compression surface of the movable die element by itself upon receiving a signal from an outside and thereby may serve as the die element drive device. The whole compression plate commonly supports an opposite end part of the frame plate and opposite end parts of the plurality of movable die elements, which are opposite from the cavity. When the whole compression plate is moved forward, the whole compression plate integrally drives the frame plate and the plurality of movable die elements forward. The whole drive device drives the whole compression plate.

The molding die of the present disclosure can achieve various types of precise compression molding through a combination of an operation of the whole compression plate through the whole drive device and an operation of the movable die elements through the die element drive devices. Therefore, the molding die of the present disclosure can be widely applied to the molded article, which has the complicated shape, or the molded article, at which the required quality varies depending on the portions of the molded article.

According to a second aspect of the present disclosure, the molding die further includes a plurality of pressure sensors that sense an internal pressure of the cavity. According to a third aspect, the plurality of movable die elements is divided into a plurality of movable die element groups according to an internal pressure distribution of a portion of the cavity where the plurality of movable die elements is placed. At least one of the plurality of pressure sensors is provided to each of the plurality of movable die element groups.

Furthermore, a fourth aspect of the present disclosure is implemented as a molding die system that includes the molding die and a controller, which controls the plurality of die element drive devices and the whole drive device. According to a fifth aspect, the molding die includes a plurality of pressure sensors, and the controller determines an amount of movement of the whole compression plate, an amount of displacement of the split compression surface of each of the plurality of movable die elements, and operation timing of the whole compression plate and the plurality of movable die elements based on an internal pressure distribution of the cavity, which is sensed with the plurality of pressure sensors, and thereafter the controller commands the determined amount of movement of the whole compression plate, the determined amount of displacement of the split compression surface of each of the plurality of movable die elements, and the determined operation timing of the whole compression plate and the plurality of movable die elements to the whole drive device and the plurality of die element drive devices.

A sixth aspect of the present disclosure is implemented as a compression molding method that uses the above molding die. This compression molding method includes the following stages (S1) to (S3).

(S1) A filling stage of filling molten resin into the cavity.

(S2) A gate sealing stage of closing the gate through the gate seal device after the filling stage.

(S3) A compression molding stage of executing in combination: "a whole compression operation" of moving the whole compression plate through the whole drive device after the gate sealing stage; and "a split compression operation" of individually displacing the split compression surfaces of the plurality of movable die elements through the plurality of die element drive devices.

BRIEF DESCRIPTION OF DRAWINGS

The present disclosure, together with the above objective, additional objectives, features and advantages thereof, will be best understood from the following description in view of the accompanying drawings.

DESCRIPTION OF EMBODIMENTS

Hereinafter, a molding die, a molding die system, and a compression molding method of various embodiments will be described with reference to the accompanying drawings.

First Embodiment

Figures 1, 2:
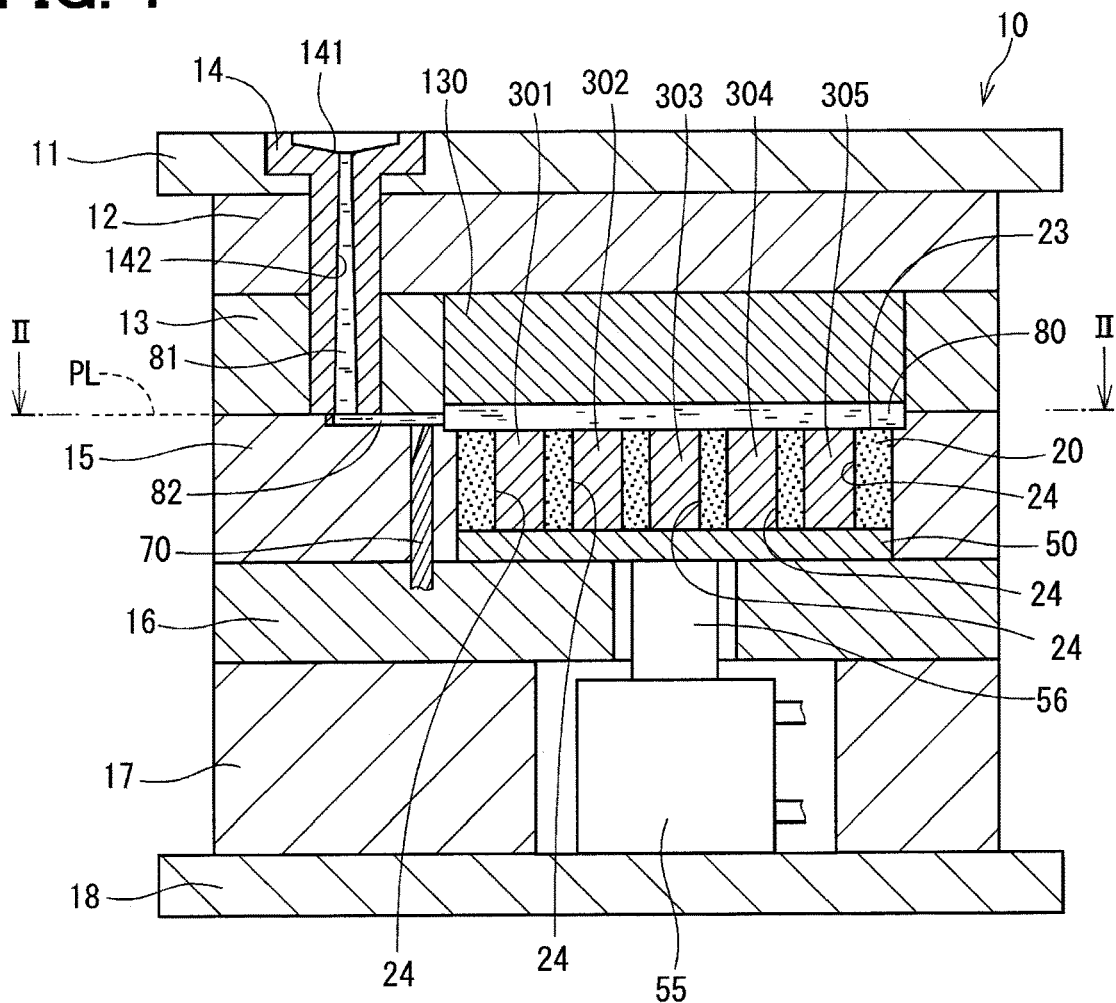
FIG. 1 is a cross-sectional view of an entire molding die according to a first embodiment.
FIG. 2 is a diagram (PL surface view) taken along line II-II in FIG. 1.

First of all, a structure of a molding die will be described with reference to FIGS. 1 to 3. FIG. 1 is a cross-sectional view of a molding die 10 taken in a die opening and closing direction while a molding machine nozzle side of the molding die 10 is shown at an upper side of FIG. 1. Here, it should be noted that a molding machine, to which the molding die 10 is installed, may be a vertical type or a horizontal type. That is, a top-to-bottom direction of the molding die 10 at the time of molding is not related to the direction shown in the drawing.

In the following description, it is assumed that the molding die 10 is installed to an ordinary injection molding machine, in which a molding machine nozzle side is a stationary side, and a die closing mechanism side is a movable side, and the terms of the stationary side and the movable side are herein defined accordingly. These terms may be appropriately interpreted in a case where the molding die 10 is installed to a special molding machine, in which, for example, the stationary side and the movable side are reversed.

For the descriptive purpose of the present embodiment, there is depicted the molding die 10, which is used to mold a molded article that is shaped into a simple planar plate form. With respect to this molded article, a high precision is required for one surface, which is located at, for example, one side of the molded article and serves as a design surface. In contrast, an opposite surface, which is opposite from the one surface and serves as a non-design surface, becomes as a back surface at the time of installing the molded article, so that the high precision is not required for the opposite surface of the molded article. In general, the design surface is molded with a die plate, which is located on the stationary side, and the non-design surface is molded with a die plate, which is located on the movable side and leaves a trace of an injector pin and a parting line in the molded article.

As shown in FIG. 1, the molding die 10 includes a stationary side installation plate 11, a stationary receiving plate 12, a stationary die plate 13, a cavity insert 130 and a sprue bush 14, which are located on the stationary side of a die parting surface (PL surface). The cavity insert 130, which corresponds to the design surface of the molded article, is made by, for example, a steel material that is abrasion resistant, and a cavity 80 side surface of the cavity insert 130 is mirror finished. A nozzle touch portion 141 and a sprue portion 142 are formed in the sprue bush 14.

Furthermore, the molding die 10 includes a movable die plate 15, a movable receiving plate 16, a spacer block 17, and a movable side installation plate 18, which are ordinary constituents and located on the movable side of the die parting surface. Additionally, the molding die 10 includes a frame plate 20, a plurality of movable die elements 301-305 and a whole compression plate 50, which are placed at an inside of a pocket hole of the movable die plate 15. Furthermore, a whole drive device 55 is placed in an inside of the movable receiving plate 16 and an inside of the spacer block 17. A part of the frame plate 20 and a part of the respective movable die elements 301-305, which face the cavity 80, form compression surfaces described later. A cross section of the frame plate 20 is indicated with a dotted texture.

Other ordinary die components, such as an injector plate, an injector pin and a return pin, which are located on the movable side, as well as a guide bush/guide pin and temperature control components, which are located on both of the stationary side and the movable side, are not depicted and described for the sake of simplicity.

The cavity 80 is formed in a space that is defined by the cavity insert 130, the frame plate 20 and the movable die elements 301-305 such that the cavity 80 is formed over the die parting surface. Molten resin, which is injected from the injection molding machine nozzle, flows through a passage 81, which is formed in the sprue portion 142 of the sprue bush 14, and then the molten resin is filled into the cavity 80. Although FIGS. 1 and 2 indicate a tab gate like form as the gate 82, through which the molten resin flows into the cavity 80, the gate form should not be limited to this form.

A gate seal device 70, which can close the gate 82, is placed at a portion of the gate 82, which is immediately before the cavity 80. The gate seal device 70 closes the gate 82 to limit backflow of the molten resin at the time, which is after filling of the molten resin into the cavity 80 and before the execution of the compression molding described later.

The frame plate 20 is a plate of a frame form and has a plurality of die element receiving holes 24, which open to the cavity 80. As shown in FIGS. 1 and 2, each of the die element receiving holes 24 is shaped into a cylindrical tubular form. An end surface of the frame plate 20, which faces the cavity 80 at a location that is other than locations of the die element receiving holes 24, forms a frame portion compression surface 23.

Next, the movable die elements will be described. Hereinafter, a reference sign 30 will be used to collectively refer to the movable die elements. Furthermore, reference signs 301-305, 311-315, 321-325 will be used to individually indicate the movable die elements. As shown in FIG. 2, the movable die elements are arranged in 3 rows×5 columns, so that a total of fifteen movable die elements 301-305, 311-315, 321-325 are respectively received in the die element receiving holes 24 of the frame plate 20. FIG. 1 indicates a cross section of the five movable die elements 301-305 in the center row.

Figure 3:
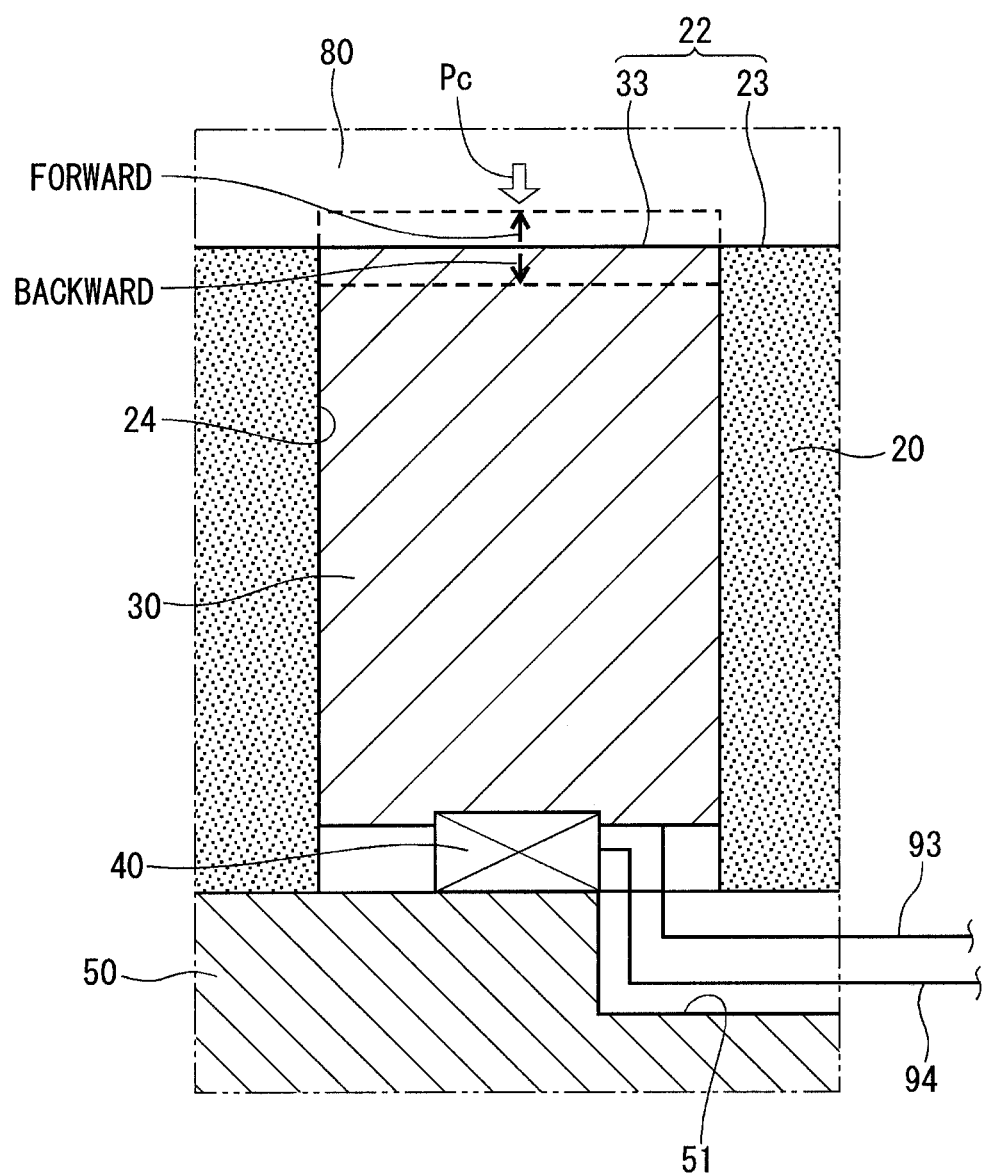
FIG. 3 is a partial cross-sectional view showing a structure of a movable die element of the molding die shown in FIG. 1.

FIG. 3 schematically indicates a structure example of the movable die element 30. The movable die element 30 is received in the die element receiving hole 24 of the frame plate 20, and an end surface of the movable die element 30, which faces the cavity 80, forms a split compression surface 33. A whole of the frame portion compression surface 23 of the frame plate 20 and the split compression surfaces 33 of the respective movable die elements 30 form a whole compression surface 22.

A pressure sensor 40 is placed at an opposite end part of the movable die element 30, which is opposite from the cavity 80. A die element drive signal line 93 and a pressure sensor signal line 94, which are received in a wiring groove 51, are connected to the movable die element 30 and the pressure sensor 40, respectively. The pressure sensor 40 senses a cavity internal pressure Pc, which is exerted against the split compression surface 33, and the pressure sensor 40 outputs a measurement signal, which indicates the sensed cavity internal pressure Pc, to a controller 90 (see FIG. 5), which will be described later, through the pressure sensor signal line 94.

Here, it should be noted that the pressure sensor 40 may not be formed in all of the movable die elements 30. For example, with reference to FIG. 2, the movable die elements 301, 302, 311, 312, 321, 322 of the first and second columns, which are the first and second, respectively, from the gate 82 side, will be defined as a first movable die element group G1. Also, the die elements 303, 304, 313, 314, 323, 324 of the third and fourth columns, which are the third and fourth, respectively, from the gate 82 side, will be defined as a second movable die element group G2. Furthermore, the die elements 305, 315, 325 of the fifth column, which is the fifth from the gate 82 side, will be defined as a second movable die element group G2.

The movable die element groups G1-G3 are grouped according to the cavity internal pressure distribution in the portion of the cavity 80 where the movable die elements 30 are placed. Specifically, it is now assumed that the cavity internal pressure is generally uniform in each movable die element group G1-G3. In such a case, the corresponding one pressure sensor 40 may be provided to each movable die element group G1-G3.

The movable die element 30 displaces the split compression surface 33 in a forward direction, which is a direction toward the cavity 80, and a backward direction, which is a direction away from the cavity 80, based on a drive signal that is inputted from the controller 90 through the die element drive signal line 93. When the split compression surface 33 is moved forward, the molten resin, which is placed in the cavity 80 at a location immediately in front of the split compression surface 33, is locally compressed. In contrast, when the split compression surface 33 is moved backward, the molten resin, which is placed in the cavity 80 at the location immediately in front of the split compression surface 33, is locally suctioned.

Figure 4:
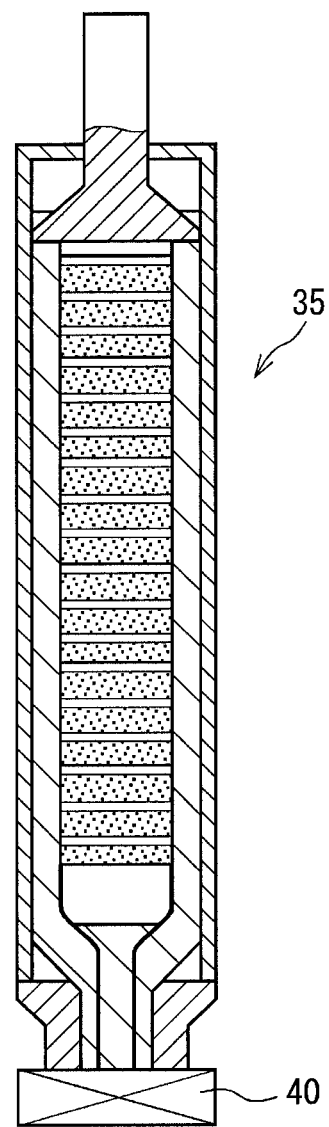
FIG. 4 is a schematic diagram of a self-powered movable die element that uses a piezoelectric actuator according to the first embodiment.

The movable die element 30 of the example shown in FIG. 3 generates a drive force by itself upon receiving the signal from the outside, so that the drive force displaces the split compression surface 33 of the movable die element 30. Specifically, the movable die element 30 is a self-powered movable die element, which serves to function as "a die element drive device." In a second embodiment described later, there will be described a construction of that the movable die element is driven by a separate die element drive device. The self-powered movable die element is a movable die element that uses, for example, a piezoelectric element, which converts an electrical signal into a pressure, or a piezomagnetic element, which converts a magnetic signal into a pressure. For example, FIG. 4 shows a piezoelectric actuator 35 made of the piezoelectric element.

Referring back to FIG. 1, the whole compression plate 50 commonly supports an opposite end part of the frame plate 20 and opposite end parts of the movable die elements 30, which are opposite from the cavity 80. The whole compression plate 50 is configured such that the whole compression plate 50 is movable forward and backward in the die opening and closing direction. When the whole compression plate 50 is moved forward, the frame plate 20 and the movable die elements 30 are integrally moved forward. Thereby, the frame portion compression surface 23 of the frame plate 20 and the split compression surfaces 33 of the movable die elements 30 simultaneously compress the molten resin in the cavity 80.

The whole drive device 55 is made of, for example, an electric cylinder or a hydraulic cylinder. A distal end of a rod 56 of the whole drive device 55 is coupled to the whole compression plate 50. The whole drive device 55 drives the whole compression plate 50 based on a signal, which is outputted from the controller 90.

Figure 5:
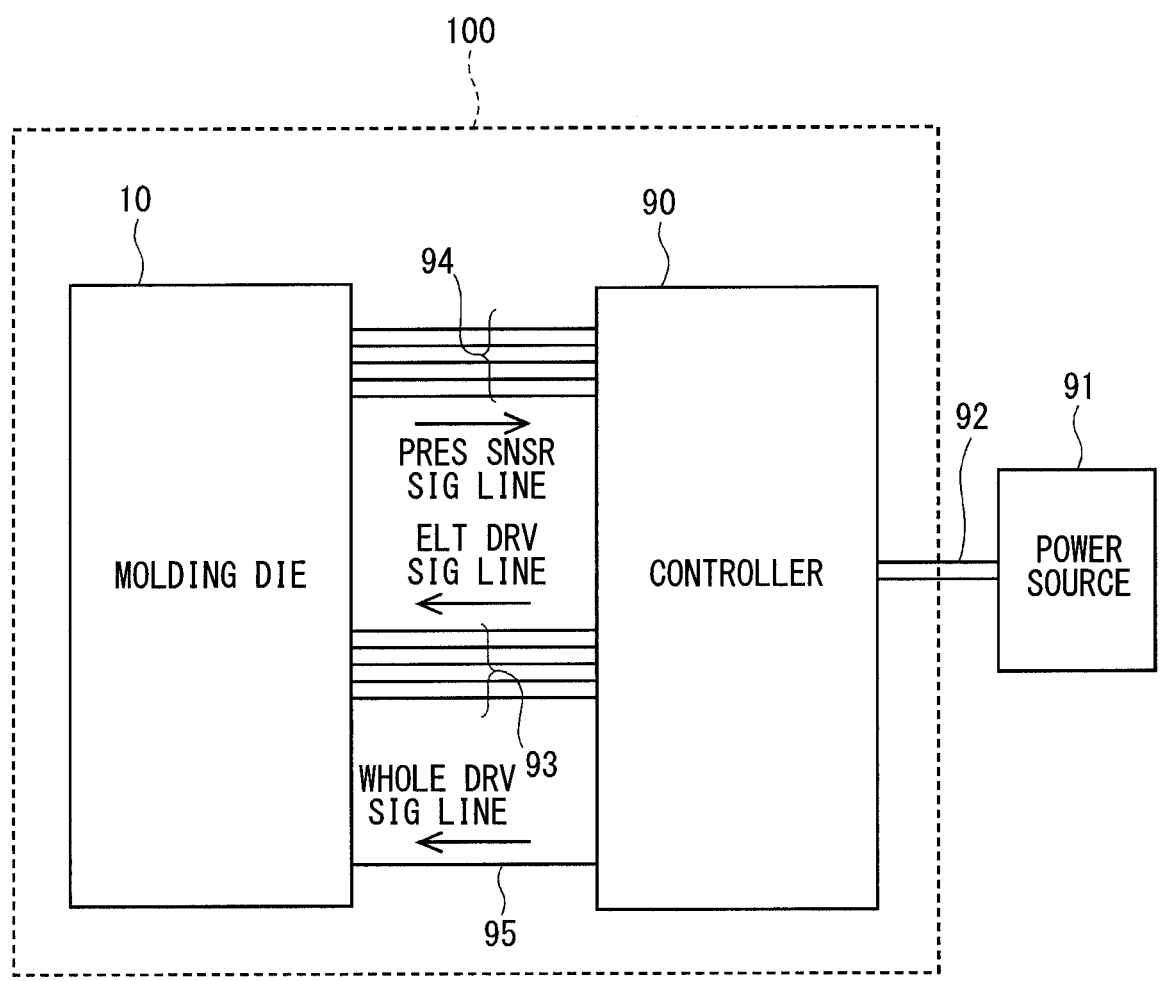
FIG. 5 is a schematic diagram of a molding die system that includes the molding die of FIG. 1.
Figure 6:
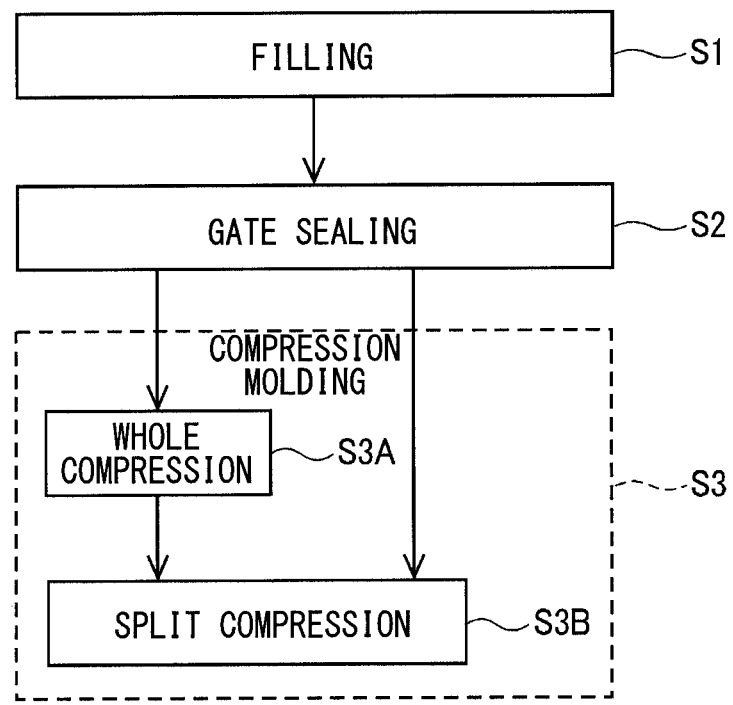
FIG. 6 is a flowchart of a compression molding method that uses the molding die according to the first embodiment.

Next, a molding die system 100, which includes the molding die 10, will be described with reference to FIG. 5. The molding die system 100 includes the molding die 10 and the controller 90. An electric power is supplied from an electric power source 91 to the controller 90 through an electric power supply line 92. The multiple die element drive signal lines 93, the multiple pressure sensor signal lines 94 and a whole drive signal line 95 are connected between the controller 90 and the molding die 10.

The controller 90 individually controls the movable die elements 30 through the die element drive signal lines 93, respectively. Also, the controller 90 controls the operation of the whole drive device 55 through the whole drive signal line 95. Particularly, in the present embodiment, the sensed cavity internal pressures, which are sensed with the pressure sensors 40, are inputted to the controller 90 through the pressure sensor signal lines 94. The controller 90 determines an amount of movement of the whole compression plate 50, an amount of displacement of the split compression surface 33 of each of the movable die elements 30, and operation timing of the whole compression plate 50 and the movable die elements 30 based on the internal pressure distribution of the cavity 80. The controller 90 outputs a drive signal, which is generated based on this determination, to the whole drive device 55 and the movable die elements 30.

Next, a compression molding method, which uses the molding die 10, will be described with reference to FIGS. 6 to 13. As shown in a basic flowchart of FIG. 6, the compression molding method includes a filling stage S1, a gate sealing stage S2 and a compression molding stage S3. At the filling stage S1, the molten resin is filled into the cavity 80. At the gate sealing stage S2, the gate 82 is closed through the gate seal device 70 after the filling stage S1.

At the compression molding stage S3, "a whole compression operation," which moves the whole compression plate 50 through the whole drive device 55, and "a split compression operation," which individually displaces the split compression surfaces 33 of the movable die elements 30, are executed in combination after the gate sealing stage S2. At the compression molding stage S3, the split compression operation S3B may be executed after execution of the whole compression operation S3A, or alternatively, only the split compression operation S3B may be executed without executing the whole compression operation S3A.

Figure 15:
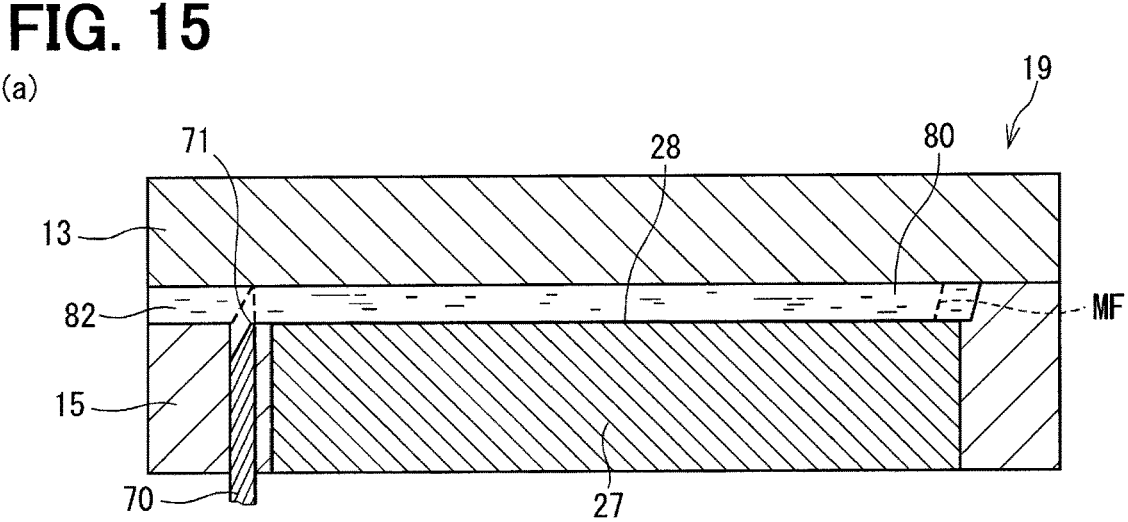
FIG. 15(*a*) is a schematic diagram showing a filling stage in a compression molding method that uses a molding die of a comparative example, and FIG. 15(*b*) is a diagram showing a gate sealing stage in the compression molding method that uses the molding die of the comparative example, and FIG. 15(*c*) is a diagram showing a compression molding stage (whole compression) in the compression molding method that uses the molding die of the comparative example.
Figure 15:
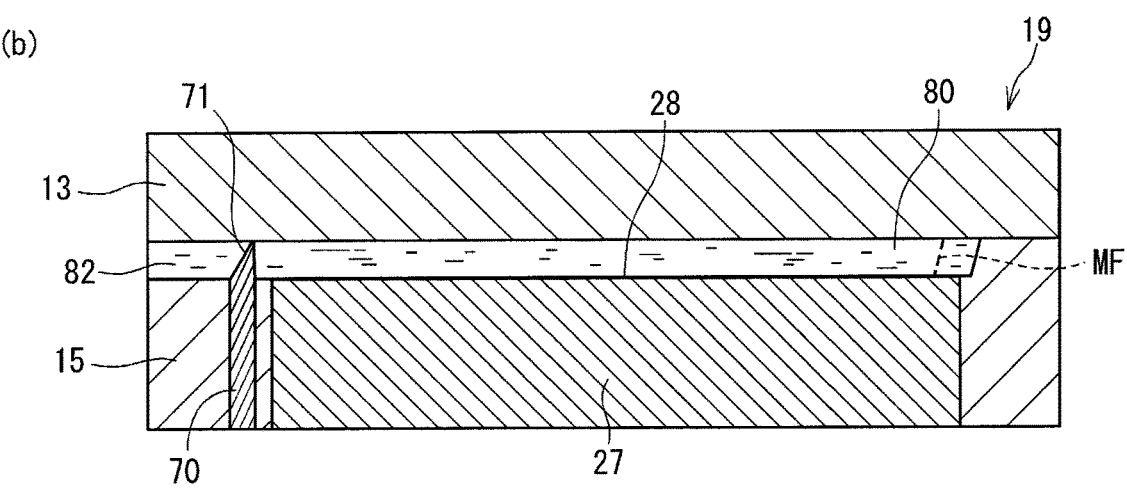
Figure 15:
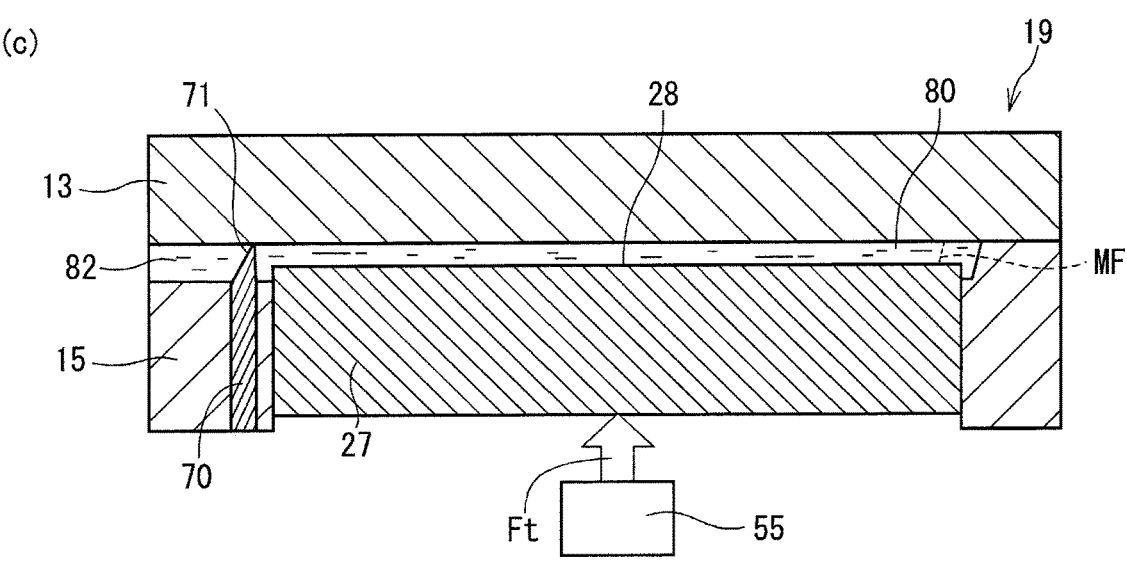

FIGS. 7 to 12 show states of the molding die 10 at the respective stages. In FIGS. 7 to 12, the depiction of the stationary side cavity insert 130 of FIG. 1 is omitted, and thereby the stationary side cavity insert 130 and the stationary die plate 13 are indicated as the integral stationary die plate 13. With respect to the movable die elements 30, the five movable die elements 301-305 are depicted in a manner similar to FIG. 1. Reference signs 331-335 respectively indicate the split compression surfaces of the movable die elements 301-305. Furthermore, for the comparative purpose, FIGS. 15(a) to 15(c) indicate a compression molding method that uses a molding die 19 of a comparative example. The molding die 19 of the comparative example includes a one-piece compression plate 27 that serves as an insert of the movable die plate 15 and has a compression surface 28, which faces the entire extent of the cavity 80.

Figure 7:
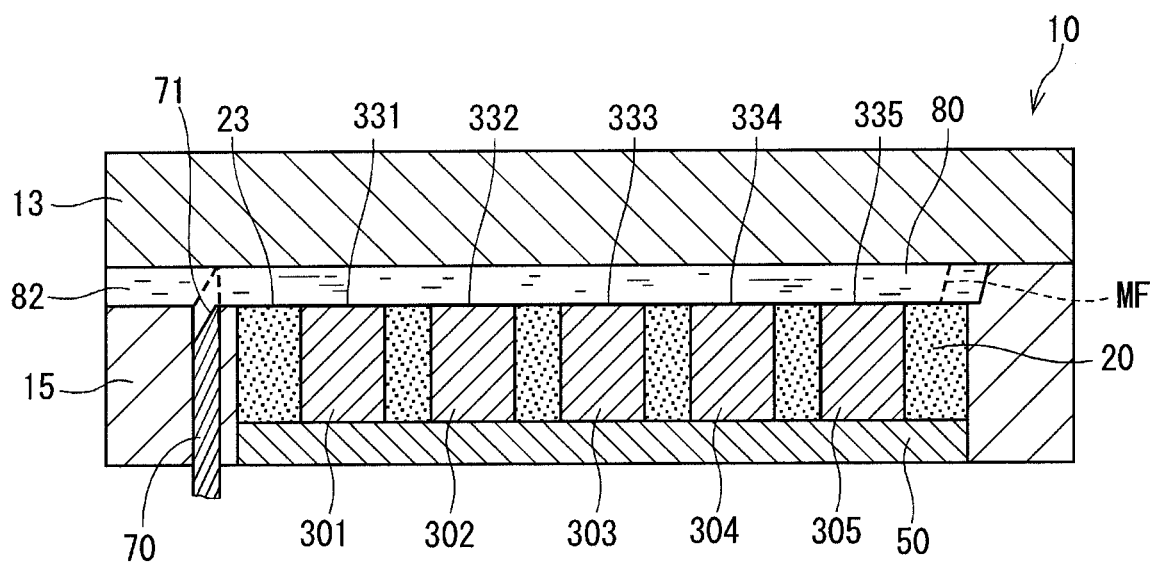
FIG. 7 is a schematic diagram of a filling stage according to the first embodiment.

Now, the filling stage S1 will be described. As shown in FIG. 7, the molten resin is filled into the cavity 80 through the gate 82 in a state where a valve portion 71 of the gate seal device 70 is opened. The filling stage may be continued until a melt front MF reaches a far end of the cavity 80. Alternatively, the valve portion 71 may be closed when the melt front MF reaches a point, which is slightly on the upstream side of the far end of the cavity 80, as indicated by a dotted line, and the filling stage may be terminated. The arrival of the melt front MF to the predetermined location may be determined with the pressure sensor(s) or may be determined based on an injection time, which is obtained through test data or simulation.

Figure 8:
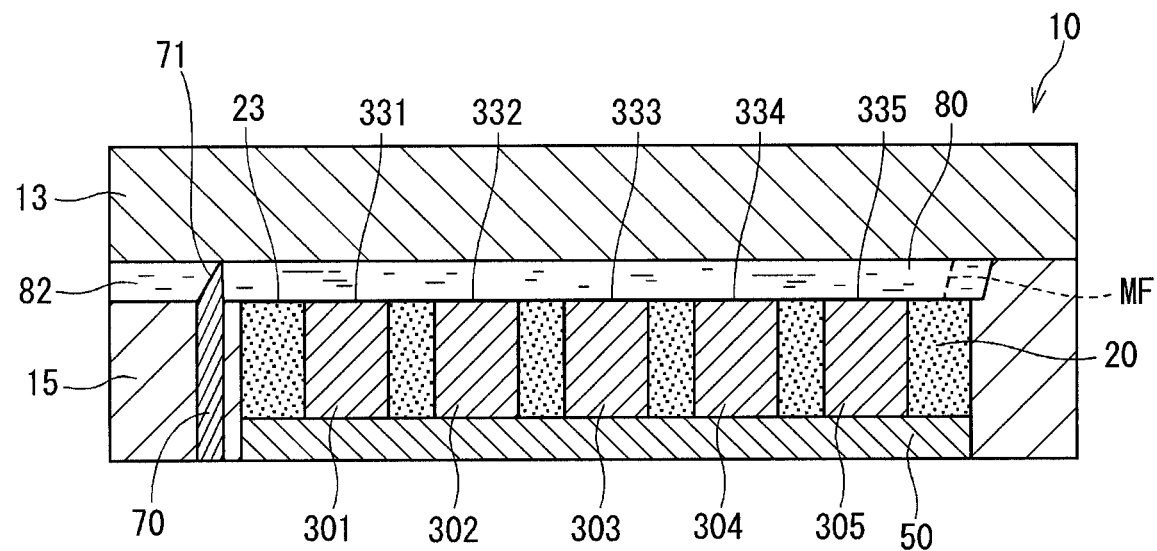
FIG. 8 is a schematic diagram of a gate sealing stage according to the first embodiment.

Next, the gate sealing stage S2 will be described. As shown in FIG. 8, the valve portion 71 of the gate seal device 70 is closed, and thereby the inflow of the molten resin into the cavity 80 is blocked. After this time point, solidification of the molten resin in the cavity 80 starts. Up to this point, the present embodiment does not substantially differ from the FIGS. 15(a) and 15(b) of the comparative example.

Figure 9:
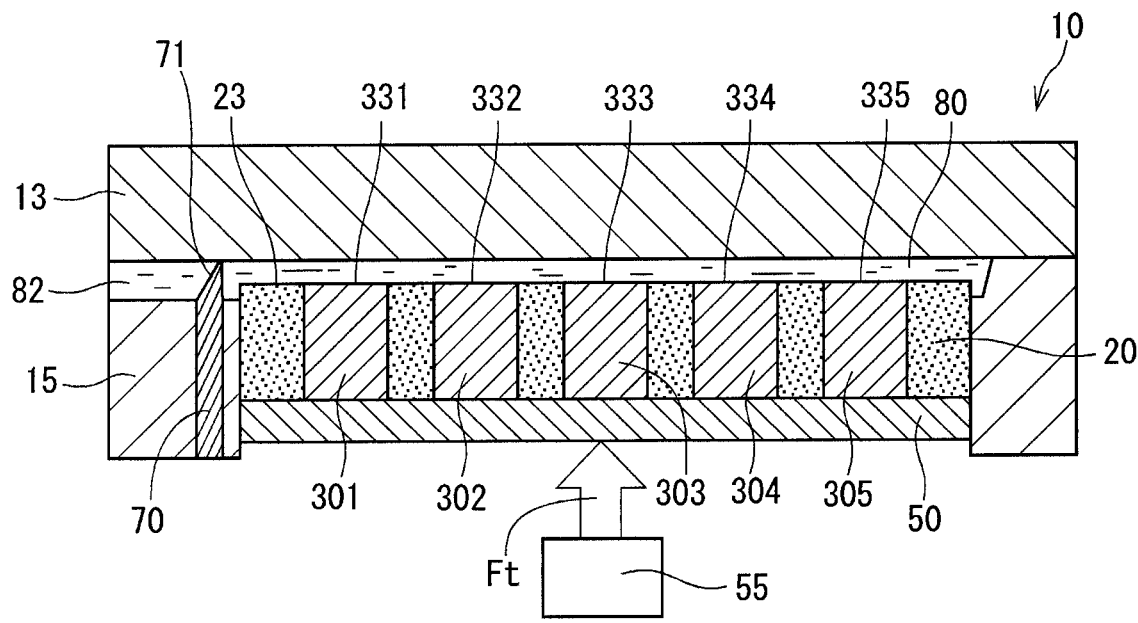
FIG. 9 is a schematic diagram showing a whole compression operation at a compression molding stage according to the first embodiment.

Next, the compression molding stage S3 will be described. First of all, a first example will be described. In a case where the split compression operation S3B is executed after the whole compression operation S3A, the whole compression plate 50 is moved forward by an entire load Ft of the entire whole drive device 55, as indicated in FIG. 9. In this way, the frame plate 20 and the split compression surfaces 331-335 of the movable die elements 301-305 are simultaneously moved forward, and thereby the molten resin in the cavity 80 is entirely compressed. This state is equivalent to the forward moving state of the one-piece compression plate 27 that is moved forward by the entire load Ft in FIG. 15(c) of the comparative example.

Figure 10:
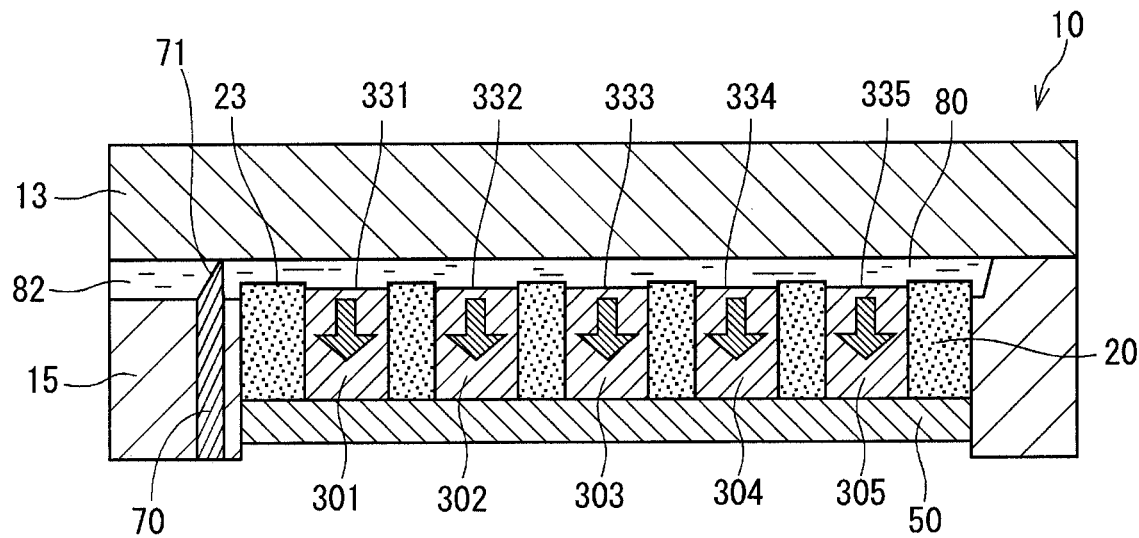
FIG. 10 is a schematic diagram showing an example (first example) of a split compression operation after the whole compression according to the first embodiment.

Next, as shown in FIG. 10, while the frame plate 20 is kept in the current position, at which the frame plate 20 and the movable die elements 301-305 are compressed as a whole, the split compression surfaces 331-335 of the movable die elements 301-305 are all driven in the backward direction. In this way, the pressure of the molten resin is reduced at the respective portions, at which the split compression surfaces 331-335 face the molten resin.

Figure 11:
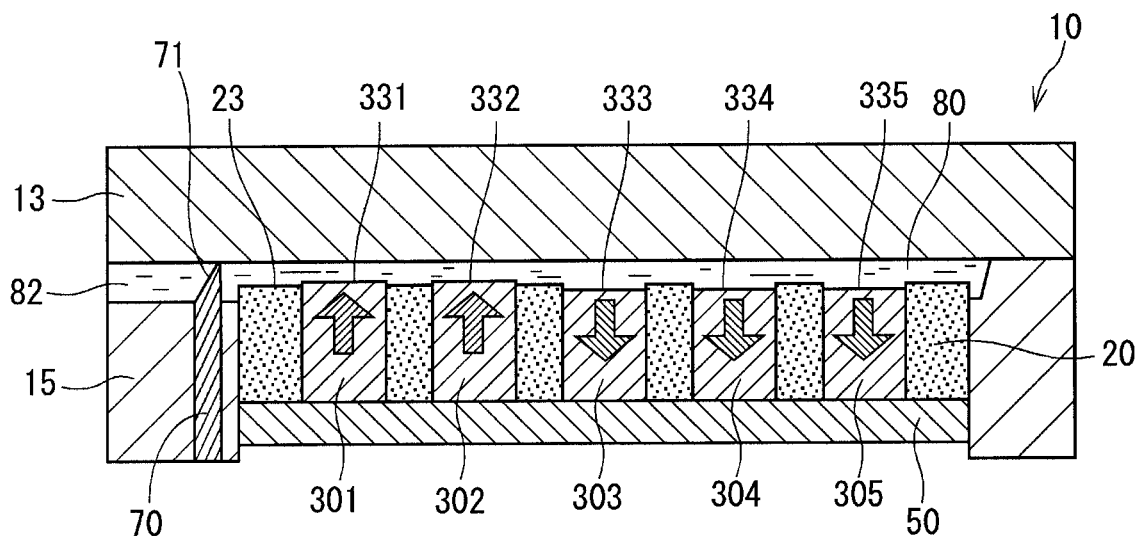
FIG. 11 is a schematic diagram showing another example (second example) of the split compression operation after the whole compression according to the first embodiment.

Next, a second example will be described. In the second example, the whole compression operation S3A is the same as that of the first example. At the split compression operation S3B, as shown in FIG. 11, with respect to the movable die elements 301-305, the split compression surfaces 33 are individually displaced in the forward direction or the backward direction. In the example of FIG. 11, the split compression surfaces 331, 332 of the movable die elements 301, 302 are moved forward, and the split compression surfaces 333, 334, 335 of the movable die elements 303, 304, 305 are moved backward. In the case where the number of the movable die elements 30 is five, the number of combinations of the forward movement(s) and the backward movement(s) will be $2^5=32$ combinations.

Figure 12:
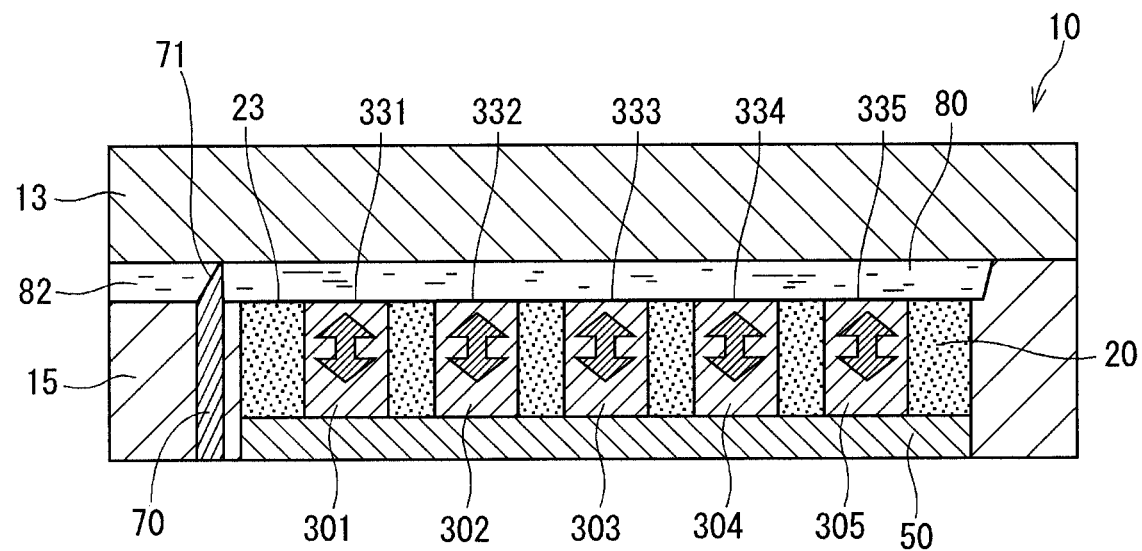
FIG. 12 is a schematic diagram showing another example (third example) of the split compression operation after the whole compression according to the first embodiment.
Figure 13:
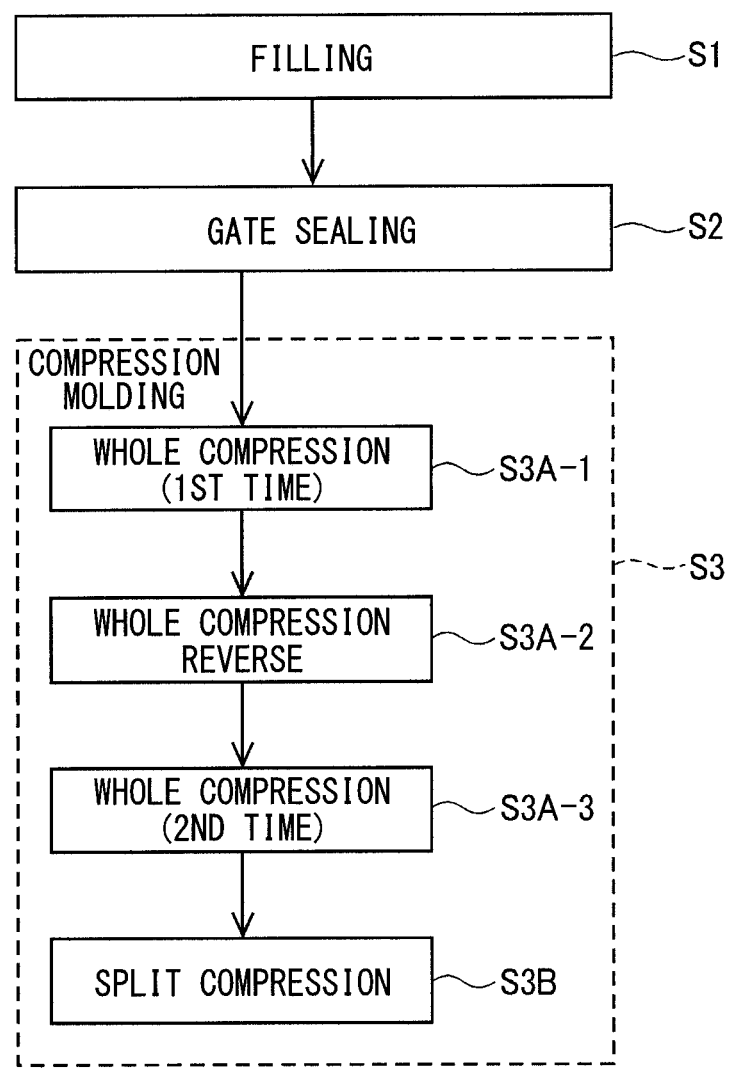
FIG. 13 is a flowchart showing an exemplary application (fourth example) of a compression molding method according to the first embodiment.

Next, a third example will be described. Different from the first and second examples, in the case where only the split compression operation S3B is executed without executing the whole compression operation S3A, while the frame plate 20 is kept at the original position, the split compression surfaces 331-335 of the movable die elements 301-305 are individually displaced in the forward direction or the backward direction, as indicated in FIG. 12.

Next, a fourth example will be described. Furthermore, in an exemplary application indicated by a flowchart of FIG. 13, the whole compression operation S3A is executed twice at the compression molding stage S3. Specifically, the whole compression operation S3A-1 of the first time, a whole compression reverse operation S3A-2, which moves the whole compression plate 50 backward, and the whole compression operation S3A-3 of the second time are executed in this order, and thereafter the split compression operation S3B is executed. As discussed above, the number of execution(s) of each of the whole compression operation S3A and the split compression operation S3B is not limited to one, and one or both of the whole compression operation S3A and the split compression operation S3B may be repeated two or more times.

Next, advantages of the molding die 10, the molding die system 100 and the compression molding method of the present embodiment will be described. (1) In the comparative example shown in FIGS. 15(a) to 15(c), it is only possible to entirely compress the molten resin regardless of the location in the cavity 80. Furthermore, in the prior art technique disclosed in the patent literature 1 (JP3767465B2), the separately drivable dies are arranged in one dimension from the gate side to the counter-gate side, and the drive sequence of the separately drivable dies is limited to the one sequence that is from the counter-gate side to the gate side. Therefore, in the comparative example and the prior art technique, an application subject is limited to a molded article, which has a simple shape, or a molded article, at which a required quality is uniform for all of corresponding portions of the molded article. That is, the comparative example and the prior art technique cannot be effectively applied to a molded article, which has a complicated shape, or a molded article, at which a required quality varies depending on the portions of the molded article.

In the molding die 10 of the present embodiment, the movable die elements 30 can be arranged in two dimensions according to the shape of the molded article. Furthermore, in the compression molding method, which uses the molding die 10, the whole compression operation S3A and the split compression operation S3B can be combined in any combination at the compression molding stage S3 to execute the compression molding. Furthermore, at the split compression operation S3B, the split compression surfaces 33 of the movable die elements 30 can be moved forward and also backward.

As discussed above, the molding die 10 of the present embodiment can achieve the various types of precise compression molding. Therefore, the molding die of the present disclosure can be widely applied to the molded article, which has the complicated shape, or the molded article, at which the required quality varies depending on the portions of the molded article. Furthermore, in a case where the resin material and the molding condition of the injection molding machine are appropriately set, and the molding die 10 of the present embodiment is effectively used, the quality of the molded article can be improved.

(2) The molding die 10 includes the pressure sensors 40, which sense the internal pressure of the cavity 80. The multiple pressure sensors 40 are provided to each of the movable die element groups G1-G3, which are grouped according to the internal pressure distribution of the cavity 80 at the portion of the cavity 80 where the movable die element groups G1-G3 are placed. The controller 90 of the molding die system 100 determines the amount of movement of the whole compression plate 50, the amount of displacement of the split compression surface 33 of each of the movable die elements 30, and the operation timing of the whole compression plate 50 and the movable die elements 30 based on the internal pressure distribution of the cavity 80, which is sensed with the pressure sensors 40, and then the controller 90 commands these determined amounts and the operation timing to the whole drive device 55 and the movable die elements 30.

In this way, for example, in a case where the state of the resin material and/or the molding condition of the injection molding machine are changed during a continuous molding operation, the drive condition of the whole compression plate 50 and the drive condition of the movable die elements 30 can be adjusted based on the internal pressure distribution, which is sensed in real-time. Thus, more precise compression molding can be achieved.

(3) In the present embodiment, the self-powered movable die elements 30, each of which has the function of the die element drive device, is used. In this way, the number of components of the molding die 10 can be reduced, and an accommodation space for accommodating the molding die 10 can be reduced.

Second Embodiment

Figure 14:
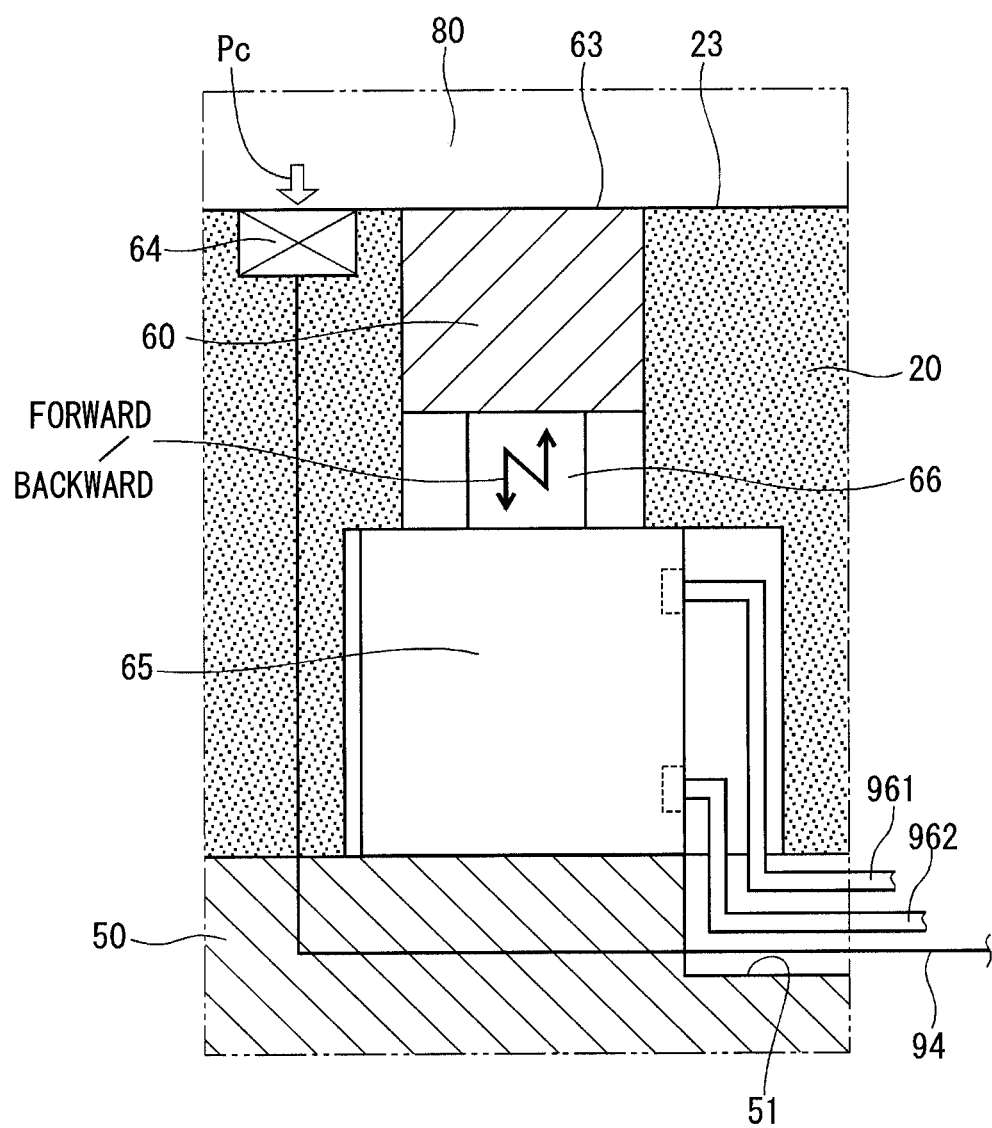
FIG. 14 is a partial cross-sectional view showing a structure of a movable die element of a molding die according to a second embodiment.

Next, a structure of movable die elements of a molding die according to a second embodiment will be described with reference to FIG. 14, which corresponds to FIG. 3 of the first embodiment. Here, the structures, which are identical to those of the first embodiment, will be indicated by the same reference signs and will not be redundantly described.

In the second embodiment, die element drive devices 65, which are independent from the movable die elements 60, are provided separately from the movable die elements 60. Each die element drive device 65 is a cylinder that is reciprocally driven by an oil pressure or an air pressure that is supplied through supply pipes 961, 962. Each movable die element 60 is coupled to a distal end of a rod 66 of the corresponding die element drive device 65. In response to the operation of the rod 66, the split compression surface 63 of the movable die element 60, which faces the cavity 80, is moved forward or backward. Furthermore, the pressure sensors 64 may be provided independently from the movable die elements 60 such that the pressure sensors 64 directly face the cavity 80. As discussed above, regardless of the drive structure for the movable die elements 60, the advantages (1) and (2) of the first embodiment can be achieved.

For example, the shape of the respective movable die elements, the number of the movable die elements, and the locations of the movable die element in the molding die of the present disclosure should not be limited to the exemplified ones of the above embodiments and may be appropriately changed according to the shape of the molded article and the required quality of the molded article. Furthermore, the compression molding method, which uses the molding die of the present disclosure, should not be limited to the exemplified one of the above embodiments, and the whole compression operation and the split compression operation at the compression molding stage may be combined in any combination. The present disclosure should not be limited to the above embodiments, and the above embodiments may be modified in various other forms within the scope of the present disclosure.

While the present disclosure has been described with reference to various exemplary embodiments thereof, it is to be understood that the present disclosure is not limited to the disclosed embodiments or constructions. To the contrary, the present disclosure is intended to cover various modifications and equivalent arrangements. In addition, while the various elements of the present disclosure are shown in various combinations and configurations, which are exemplary, other combinations and configurations, including more, less or only a single element, are also within the spirit and scope of the present disclosure.

The invention claimed is:

1. A molding die comprising:
a cavity that is formed over a die parting surface when a movable die plate is engaged and is to be filled with molten resin;
a gate seal device that is operable to close a gate, through which the molten resin flows into the cavity;
a frame plate that has a plurality of die element receiving holes, which open to the cavity, wherein an end surface of the frame plate, which faces the cavity at a location that is other than locations of the plurality of die element receiving holes, forms a frame portion compression surface;
a plurality of movable die elements, which are respectively received in the plurality of die element receiving holes, wherein an end surface of each of the plurality of movable die elements, which faces the cavity, forms a split compression surface that is displaceable in a forward direction, which is a direction toward the cavity, and a backward direction, which is a direction away from the cavity:
a plurality of die element drive devices that respectively drive the split compression surfaces of the plurality of movable die elements;
a whole compression plate that commonly supports an opposite end part of the frame plate and opposite end parts of the plurality of movable die elements, which are opposite from the cavity, wherein the whole compression plate is configured to move forward to integrally drive the frame plate and the plurality of movable die elements forward to compress the molten resin filled in the cavity; and
a whole drive device that drives the whole compression plate, wherein
one or more of the plurality of die element drive devices are configured to drive corresponding one or more of the split compression surfaces of the plurality of movable die elements forward or backward relative to the molten resin after the whole compression plate is moved forward to integrally drive the frame plate and the plurality of movable die elements forward to compress the molten resin filled in the cavity.

2. The molding die according to claim 1, wherein the plurality of movable die elements function as the plurality of die element drive devices, respectively, and each of the plurality of movable die elements is configured to drive the split compression surface thereof forward or backward upon receiving a signal from a controller.

3. The molding die according to claim 1, further comprising a plurality of pressure sensors that sense an internal pressure of the cavity.

4. The molding die according to claim 3, wherein:
the plurality of movable die elements is divided into a plurality of movable die element groups according to an internal pressure distribution of a portion of the cavity where the plurality of movable die elements is placed; and
at least one of the plurality of pressure sensors is provided to each of the plurality of movable die element groups.

5. A molding die system comprising:
the molding die of claim 1; and
a controller that controls the plurality of die element drive devices and the whole drive device.

6. The molding die system according to claim 5, wherein:
the molding die includes a plurality of pressure sensors that sense an internal pressure of the cavity; and
the controller determines an amount of movement of the whole compression plate, an amount of displacement of the split compression surface of each of the plurality of movable die elements, and operation timing of the whole compression plate and the plurality of movable die elements based on an internal pressure distribution of the cavity, which is sensed with the plurality of pressure sensors.

7. A compression molding method that uses the molding die of claim 1, the compression molding method comprising:
a filling stage of filling molten resin into the cavity;
a gate sealing stage of closing the gate through the gate seal device after the filling stage; and
a compression molding stage of executing:
a whole compression operation of moving the whole compression plate through the whole drive device after the gate sealing stage; and thereafter
a split compression operation of individually displacing the split compression surfaces of the plurality of movable die elements through the plurality of die element drive devices.

8. The molding die according to claim 1, wherein one or more of the plurality of die element drive devices are configured to drive corresponding one or more of the split compression surfaces of the plurality of movable die elements backward relative to the molten resin after the whole compression plate is moved forward.

9. The molding die according to claim 1, wherein the plurality of movable die elements function as the plurality of die element drive devices, respectively, and each of the plurality of movable die elements is configured to drive the split compression surface thereof backward upon receiving a signal from a controller.

* * * * *